(12) United States Patent
Moon et al.

(10) Patent No.: US 9,477,589 B2
(45) Date of Patent: Oct. 25, 2016

(54) STORAGE DEVICE THAT PERFORMS A DE-DUPLICATION OPERATION, AND METHOD OF OPERATING THE SAME

(71) Applicant: SAMSUNG ELECTRONICS CO., LTD., Suwon-si, Gyeonggi-do (KR)

(72) Inventors: Sangkwon Moon, Pyeongtaek-si (KR); Ji Hong Kim, Seoul (KR); Ji Sung Park, Seoul (KR); Hyunchul Park, Ansan-si (KR); Kyung Ho Kim, Seoul (KR)

(73) Assignees: SAMSUNG ELECTRONICS CO., LTD., Suwon-Si, Gyeonggi-Do (KR); SNU R&DB FOUNDATION, Seoul (KR)

( * ) Notice: Subject to any disclaimer, the term of this patent is extended or adjusted under 35 U.S.C. 154(b) by 107 days.

(21) Appl. No.: 14/489,676

(22) Filed: Sep. 18, 2014

(65) Prior Publication Data

US 2015/0205716 A1 Jul. 23, 2015

(30) Foreign Application Priority Data

Jan. 23, 2014 (KR) ........................ 10-2014-0008481

(51) Int. Cl.
| | |
|---|---|
| *G06F 12/00* | (2006.01) |
| *G06F 12/02* | (2006.01) |
| *G06F 3/06* | (2006.01) |
| *G06F 17/30* | (2006.01) |

(52) U.S. Cl.
CPC ............. *G06F 12/0238* (2013.01); *G06F 3/06* (2013.01); *G06F 17/3033* (2013.01); *G06F 17/30156* (2013.01); *G06F 17/30191* (2013.01)

(58) Field of Classification Search
CPC ........... G06F 3/0641; G06F 17/30156; G06F 17/3033; G06F 17/30371; G06F 3/0679; G06F 3/0689; G06F 12/00; G06F 17/30159; G06F 17/30949

See application file for complete search history.

(56) References Cited

U.S. PATENT DOCUMENTS

| | | | |
|---|---|---|---|
| 7,937,371 B2 | 5/2011 | Bates et al. | |
| 8,161,211 B2 | 4/2012 | Hirayama | |
| 8,321,384 B2 | 11/2012 | Tokoro | |
| 8,935,506 B1* | 1/2015 | Gopalan | ............. G06F 12/1009 711/202 |

(Continued)

FOREIGN PATENT DOCUMENTS

| | | |
|---|---|---|
| JP | 2012-164130 | 8/2012 |
| JP | 2012-198831 | 10/2012 |
| JP | 2013514558 | 4/2013 |

*Primary Examiner* — Mardochee Chery
(74) *Attorney, Agent, or Firm* — F. Chau & Associates, LLC

(57) ABSTRACT

A storage device is provided which includes a nonvolatile memory device configured to store a plurality of reference data, a memory configured to store a hash manage table used to manage a plurality of reference hash keys of each of the plurality of reference data, a hash key generator configured to generate a plurality of hash keys based on write requested data, and a memory controller configured to compare the plurality of hash keys and reference hash keys of each reference data to determine whether to store the write requested data in the nonvolatile memory device. The memory controller selects one of the plurality of reference data according to a similarity between the plurality of hash keys and the plurality of reference hash keys of each reference data and stores the write requested data and the selected reference data in the nonvolatile memory device to refer to each other.

18 Claims, 17 Drawing Sheets

(56) References Cited

U.S. PATENT DOCUMENTS

| | | |
|---|---|---|
| 2011/0276744 A1 | 11/2011 | Sengupta et al. |
| 2013/0036289 A1 | 2/2013 | Welnicki et al. |
| 2013/0054894 A1 | 2/2013 | Kawaguchi |
| 2013/0054906 A1 | 2/2013 | Anglin et al. |
| 2013/0151759 A1* | 6/2013 | Shim .................. G06F 12/0246 711/103 |
| 2013/0212074 A1 | 8/2013 | Romanski et al. |

* cited by examiner

| | | | 1343 |
|---|---|---|---|
| Deduplication Matching Table | | | |
| Host ADDR | Deduplication | Identical | Reference ADDR |
| H_ADDR_D4 | Yes | Full | ADDR1 |
| H_ADDR_D6 | Yes | Partial | ADDR3 |

STORAGE DEVICE THAT PERFORMS A DE-DUPLICATION OPERATION, AND METHOD OF OPERATING THE SAME

CROSS-REFERENCE TO RELATED APPLICATIONS

This application claims priority under 35 U.S.C. §119 to Korean Patent Application No. 10-2014-0008481 filed on Jan. 23, 2014, the disclosure of which is incorporated by reference herein in its entirety.

TECHNICAL FIELD

Exemplary embodiments of the inventive concept described herein relate to a storage device and its operating method, and more particularly, to a nonvolatile memory device and its operating method.

DISCUSSION OF THE RELATED ART

A semiconductor memory device is used as a storage device, which stores data. Semiconductor memory devices include volatile memories such as, for example, a DRAM, an SRAM, etc., and nonvolatile memories such as, for example, an EEPROM, a FRAM, a PRAM, an MRAM, a flash memory, etc. The volatile memories lose their data at power-off, while the nonvolatile memories retain their data even at power-off.

A nonvolatile memory is used in a variety of devices such as, for example, MP3 players, digital cameras, handheld phones, camcorders, flash cards, solid state drives, etc. As storage capacities required by users increase, there is required a technique of using a storage space of a nonvolatile memory efficiently.

SUMMARY

One aspect of exemplary embodiments of the inventive concept is directed to provide a storage device which includes a nonvolatile memory device configured to store a plurality of reference data, a memory configured to store a hash manage table used to manage a plurality of reference hash keys of each of the plurality of reference data, a hash key generator configured to generate a plurality of hash keys based on write requested data, and a memory controller configured to compare the plurality of hash keys and reference hash keys of each reference data to determine whether to store the write requested data in the nonvolatile memory device. The memory controller selects one of the plurality of reference data according to a similarity between the plurality of hash keys and the plurality of reference hash keys of each reference data and stores the write requested data and the selected reference data in the nonvolatile memory device to refer to each other.

In exemplary embodiments, the memory controller divides the write requested data into a plurality of sub-pages. The hash key generator generates the plurality of hash keys corresponding to the plurality of sub-pages.

In exemplary embodiments, the memory further stores a de-duplication matching table. When the similarity between the write requested data and the selected reference data is above a reference value, reference information of the write requested data is registered at the de-duplication matching table.

In exemplary embodiments, when the plurality of reference hash keys are duplicated to a plurality of hash keys of the selected reference data, the memory controller maps an address of the write requested data onto an address of the nonvolatile memory device where the selected reference data is stored.

In exemplary embodiments, when the similarity between the write requested data and the selected reference data is above a reference value, the memory controller performs an XOR operation on the write requested data and the selected reference data, compresses resultant data of the XOR operation, and stores the compressed data in the nonvolatile memory device.

In exemplary embodiments, when the similarity between the write requested data and the selected reference data does not exceed a reference value, the plurality of hash keys are registered at the hash manage table.

In exemplary embodiments, an empty size of the hash manage table reaches a reference size, and the memory controller erases a plurality of reference hash keys associated with reference data not referring to a plurality of hash key information of the write requested data from among a plurality of reference hash keys of each reference data included in the hash manage table.

In exemplary embodiments, when an empty size of the hash manage table reaches a reference size, the memory controller combines at least two of a plurality of reference data included in the hash manage table.

In exemplary embodiments, the at least two reference data is combined through an XOR operation.

In exemplary embodiments, when an empty size of the hash manage table reaches a reference size, and the memory controller and a reference frequency between a plurality of hash keys of the selected reference data and the plurality of hash keys of the write requested data is minimal, the memory controller performs an inverse XOR operation on the selected reference data and reference data referring to the selected reference data.

In exemplary embodiments, a plurality of hash keys of the selected reference data are excluded from the hash manage table, and the inversely XORed data is stored in the nonvolatile memory device through compression.

In exemplary embodiments, the de-duplication manage table is stored in a DRAM or an SRAM.

An aspect of exemplary embodiments of the inventive concept is directed to provide an operating method of a storage device including generating a plurality of hash keys about write requested data, comparing the plurality of hash keys thus generated with a plurality of reference hash keys of each of a plurality of reference data managed using a hash manage table, when a similarity between the plurality of hash keys of the write requested data and a plurality of reference hash keys of one of the plurality of reference data is above a reference value, performing an XOR operation about the write requested data and the one reference data, and compressing and storing the XORed data.

In exemplary embodiments, when a similarity between the plurality of hash keys of the write requested data and the plurality of reference hash keys of the one reference data is below the reference value, the write requested data is compressed and stored in the nonvolatile memory device.

In exemplary embodiments, when an empty size of the hash manage table reaches a reference size, at least two of a plurality of reference data managed using the hash manage table are combined.

An aspect of exemplary embodiments of the inventive concept is directed to provide an operating method of a storage device including generating a plurality of hash keys about write requested data, comparing the plurality of hash keys thus generated with a plurality of reference hash keys of each of a plurality of reference data, determining whether to store the write requested data in a nonvolatile memory device in response to the compared result, selecting one of the plurality of reference data according to a similarity between the plurality of hash keys and the plurality of reference hash keys, storing the write requested data and the selected reference data in a memory to refer to each other, the memory storing the plurality of reference data, and erasing at least one of the plurality of reference data when an empty size of the memory reaches a reference size.

In exemplary embodiments, the memory stores a count of each of the plurality of reference data.

In exemplary embodiments, the count of each of the plurality of reference data increases according to a number of references of each of the plurality of the reference data.

In exemplary embodiments, when the empty size of the memory reaches the reference size, a reference data having a lowest count among the plurality of reference data is erased based on counts of the plurality of reference data stored in the memory.

In exemplary embodiments, erasing the plurality of reference data includes detecting a first reference data having a plurality of first hash keys and a second reference data having a plurality of second hash keys similar to the plurality of first hash keys among the plurality of reference data, controlling the second reference data to refer the first reference data, and erasing the second reference data. The first reference data referred by the second reference data is maintained in the memory.

In exemplary embodiments, a second count of the second reference data is lower than a first count of the first reference data.

According to exemplary embodiments of the inventive concept, a storage device determines whether write requested data is identical to data stored in a nonvolatile memory device based on a de-duplication manage table, thereby preventing the write requested data from being overlapped on the nonvolatile memory device that stores the same data as the write requested data. Also, a memory resource necessary to store the de-duplication manage table is minimized by managing the size of the de-duplication manage table below a reference.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Figure 1:
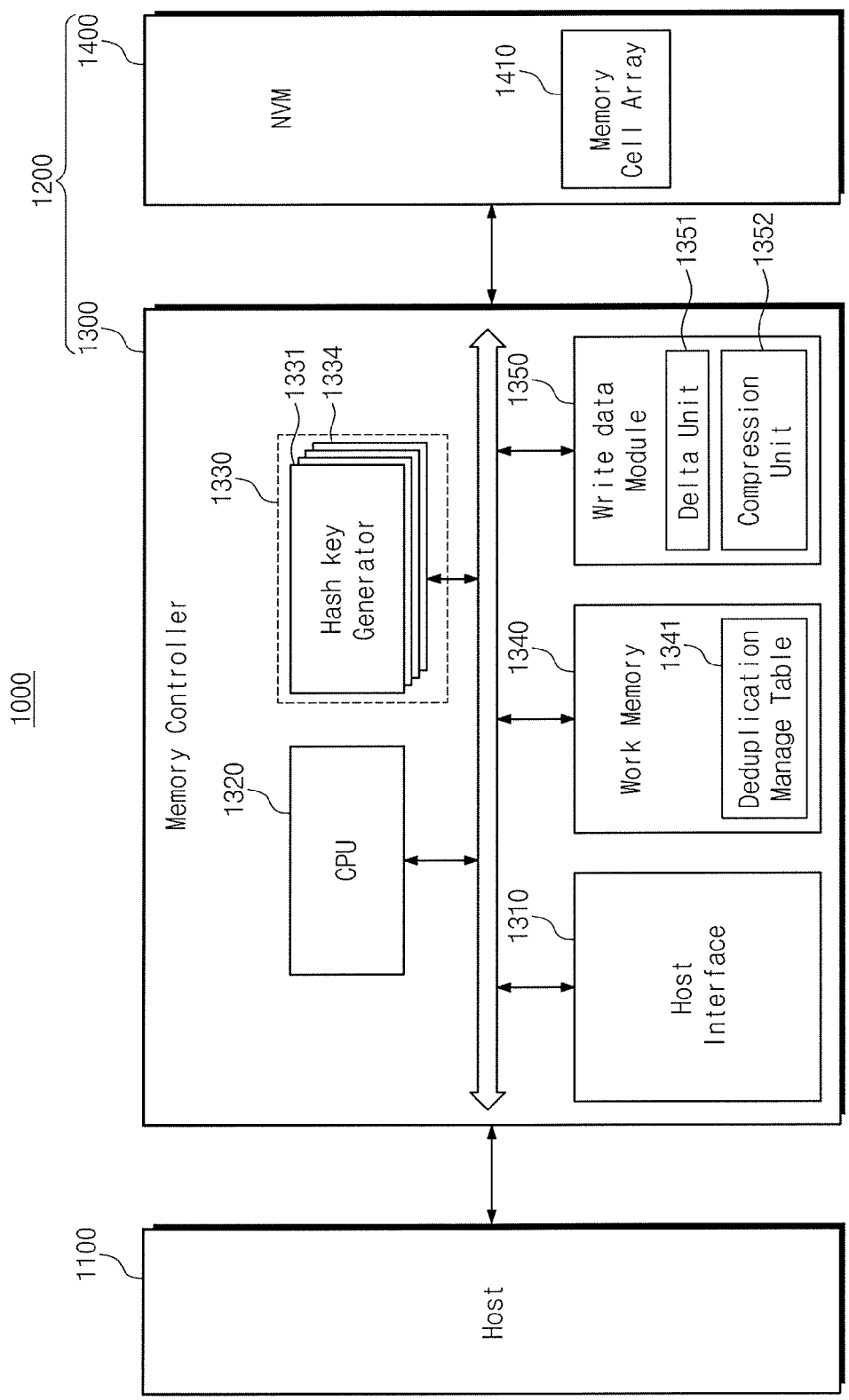
FIG. 1 is a block diagram schematically illustrating a memory system according to an exemplary embodiment of the inventive concept.

Exemplary embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under"

can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

It will be understood that when an element or layer is referred to as being "on", "connected to", "coupled to", or "adjacent to" another element or layer, it can be directly on, connected, coupled, or adjacent to the other element or layer, or intervening elements or layers may be present.

FIG. 1 is a block diagram schematically illustrating a memory system according to an exemplary embodiment of the inventive concept. Referring to FIG. 1, a memory system 1000 includes a host 1100 and a storage device 1200.

The host 1100 provides a memory controller 1300 with an address for reading, writing, or erasing data stored in the storage device 1200.

The storage device 1200 stores data. The storage device 1200 contains the memory controller 1300 and a nonvolatile memory device 1400.

The memory controller 1300 controls an overall operation of the storage device 1200, and the nonvolatile memory device 1400 stores data. Upon a write request from the host 1100, the storage device 1200 reads data from the nonvolatile memory device 1400 and transmits the read data to the host 1100.

Upon the write request from the host 1100, the storage device 1200 receives write requested data from the host 1100. The write requested data may be data that is duplicated or partially similar to data stored in the nonvolatile memory device 1400.

As an example, if write requested data provided from the host 1100 is duplicated to data stored in the nonvolatile memory device 1400, the storage device 1200 according to an exemplary embodiment of the inventive concept does not store the write requested data in the nonvolatile memory device 1400. In this case, the storage device 1200 processes a write request of the host 1100 by making an address of the write requested data become mapped onto an address of the nonvolatile memory device 1400 previously stored.

As another example, if write requested data provided from the host 1100 is partially similar to data stored in the nonvolatile memory device 1400, the storage device 1200 according to an exemplary embodiment of the inventive concept computes the write requested data and reference data to store a computed result in the nonvolatile memory device 1400.

Such an operation that previous stored data is referred instead of storing write requested data when the write requested data is duplicated or partially similar to the previously stored data may be referred to herein as a de-duplication operation. The storage device 1200 of exemplary embodiments of the inventive concept efficiently uses a storage space of the nonvolatile memory device 1400 by performing the de-duplication operation.

The memory controller 1300 controls an overall operation of the storage device 1200. For example, the memory controller 1300 may control a write operation, an erase operation, and a read operation of the storage device 1200.

Upon a write request of the host 1100, the memory controller 1300 determines whether write requested data is data that is duplicated or similar to data stored in the nonvolatile memory device 1400. For example, if first data write requested is the same as second data stored in the nonvolatile memory device 1400, the memory controller 1300 controls the storage device 1200 such that a logical address of the first data is mapped onto a physical address of the second data.

Referring to FIG. 1, the memory controller 1300 contains a host interface 1310, a central processing unit 1320, a hash key generation unit 1330, a work memory 1340, and a write data module 1350.

The host interface 1310 interfaces between the storage device 1200 and the host 1100. The central processing unit 1320 controls an overall operation of the memory controller 1300.

The hash key generation unit 1330 generates a hash key about write requested data. In exemplary embodiments, the hash key generation unit 1330 includes first to fourth hash key generators 1331 to 1334. In FIG. 1, there is illustrated an example in which the hash key generation unit 1330 includes four hash key generators according to such a condition that write requested data is divided into four sub-pages. However, exemplary embodiments of the inventive concept are not limited thereto. For example, the number of hash key generators may be changed according to the number of sub-pages of write requested data.

Also, since a plurality of hash key generators may be included, the hash key generation unit 1330 simultaneously generates a plurality of hash keys based on write requested data, thereby reducing a time taken to generate hash keys.

A hash key is used to determine similarity of data. For example, when a hash key of write requested data is identical or similar to a hash key managed by a de-duplication manage table 1341, the write requested data may be determined to be similar or identical to data stored in the nonvolatile memory device 1400.

The hash key generation unit 1330 generates a plurality of hash keys about write requested data. The hash key generation unit 1330 compares a plurality of hash keys with hash keys managed by the de-duplication manage table 1341. If at least one of hash keys about write requested data is matched with hash keys of the de-duplication manage table 1341, the write requested data may be determined to be similar or duplicated to data stored in the nonvolatile memory device 1400.

As illustrated in FIG. 1, the hash key generation unit 1330 may be implemented with hardware. However, exemplary embodiments of the inventive concept are not limited thereto. For example, the hash key generation unit 1330 may be implemented by software that performs a function of generating hash keys. Such software may be stored in the work memory 1340.

The work memory 1340 is used to store information between write requested data and reference data, that is, de-duplication management data. In exemplary embodiments, the work memory 1340 may be implemented with a volatile memory, such as a DRAM or an SRAM.

The work memory 1340 includes the de-duplication manage table 1341. The de-duplication manage table 1341 is used to manage hash keys of reference data that is stored in the nonvolatile memory device 1400. Upon a write request of the host 1100, the central processing unit 1320 may check whether write requested data is duplicated or similar to data stored in the nonvolatile memory device 1400, referring to hash keys stored in the de-duplication manage table 1341.

The de-duplication manage table 1341 may manage hash keys about relatively recently write requested reference data (or read requested data). For example, a previous write requested data or a previous read requested data may be used as the reference data. Hash keys generated using a previous write requested data or a previous read requested data may be registered at the de-duplication manage table 1341.

For example, upon a write request of the host 1100, the hash key generation unit 1330 generates a plurality of hash keys about write requested data, and for determination on duplication, the central processing unit 1320 compares the hash keys thus generated with a hash key of the de-duplication manage table 1341.

Meanwhile, the size of the de-duplication manage table 1341 may be limited to a predetermined size. For example, the de-duplication manage table 1341 may manage hash keys about a relatively recently write requested data or read requested data of reference data stored in the nonvolatile memory device 1400.

For example, when the usage of the de-duplication manage table 1341 reaches a predetermined size, the central processing unit 1320 deletes farthest generated ones of hash keys managed in the de-duplication manage table 1341. This may mean that the usage of the de-duplication manage table 1341 is maintained below the predetermined size. However, exemplary embodiments of the inventive concept are not limited thereto. For example, the central processing unit 1320 may use a method of deleting hash keys of data with the lowest access frequency.

The write data module 1350 computes and compresses write requested data and reference data, according to whether the write requested data is similar to the reference data stored in the nonvolatile memory device 1400. To accomplish this, the write data module 1350 includes a delta unit 1351 to compute write requested data and reference data, and a compression unit 1352 to compress the computed data.

The nonvolatile memory device 1400 contains a memory cell array 1410. In exemplary embodiments, the nonvolatile memory device 1400 may be a flash memory.

For example, the memory cell array 1410 has a plurality of memory block, each of which contains a plurality of flash memory cells. Each flash memory cell may store one data bit or two or more data bits. The de-duplication manage table 1341 is stored in the nonvolatile memory device 1400 periodically or at power-off of the storage device 1200 and is loaded onto the work memory 1340 at power-on of the storage device 1200.

Meanwhile, the storage device 1200 according to an exemplary embodiment of the inventive concept may use a variety of memories as the nonvolatile memory device 1400. For example, the nonvolatile memory device 1400 may be implemented with a nonvolatile memory including, for example, flash memory, magnetic RAM (MRAM), Spin-Transfer Torque MRAM, Conductive bridging RAM (CBRAM), FeRAM (Ferroelectric RAM), phase RAM (PRAM) called OUM (Ovonic Unified Memory), resistive RAM (RRAM or Re-RAM), nanotube RAM, polymer RAM (PoRAM), Nano Floating Gate Memory (NFGM), holographic memory, molecular electronics memory, or insulator resistance change memory.

As described above, when write requested data is duplicated or similar to data stored in the nonvolatile memory device 1400, the storage device 1200 according to an exemplary embodiment of the inventive concept may prevent the write requested data from being overlapped on the nonvolatile memory device 1400.

Figure 2:
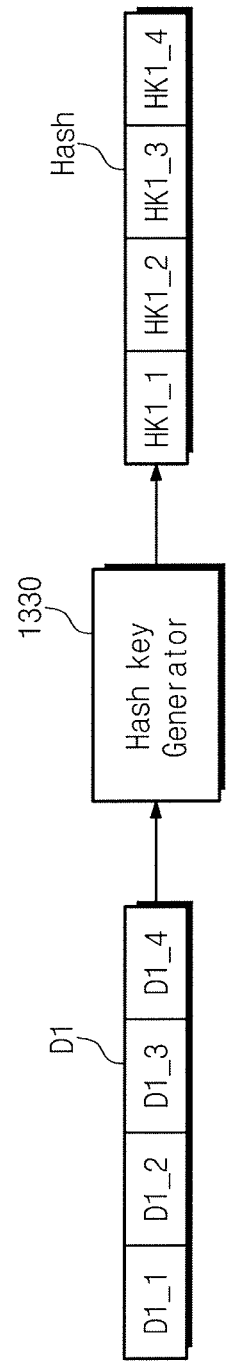
FIG. 2 is a diagram for describing an operation of a hash key generation unit shown in FIG. 1 according to an exemplary embodiment of the inventive concept.

FIG. 2 is a diagram for describing an operation of a hash key generation unit shown in FIG. 1.

Referring to FIG. 2, a central processing unit 1320 (refer to FIG. 1) receives write requested data (e.g., first data) D1 from a host 1100 (refer to FIG. 1). The central processing unit 1320 divides the first data D1 into four sub-pages D1_1, D1_2, D1_3, and D1_4 and provides them to a hash key generation unit 1330.

The hash key generation unit 1330 generates a plurality of hash keys HK1_1, HK1_2, HK1_3, and HK1_4 corresponding to the sub-pages D1_1, D1_2, D1_3, and D1_4 about the first data D1 write requested.

In FIG. 2, there is illustrated an example in which the hash key generation unit 1330 generates four hash keys HK1_1, HK1_2, HK1_3, and HK1_4. However, exemplary embodiments of the inventive concept are not limited thereto. For example, the hash key generation unit 1330 may generate eight hash keys corresponding to eight sub-pages. In this case, it is possible to determine similarity of sub-pages of write requested data and hash keys of reference data.

Figure 3:
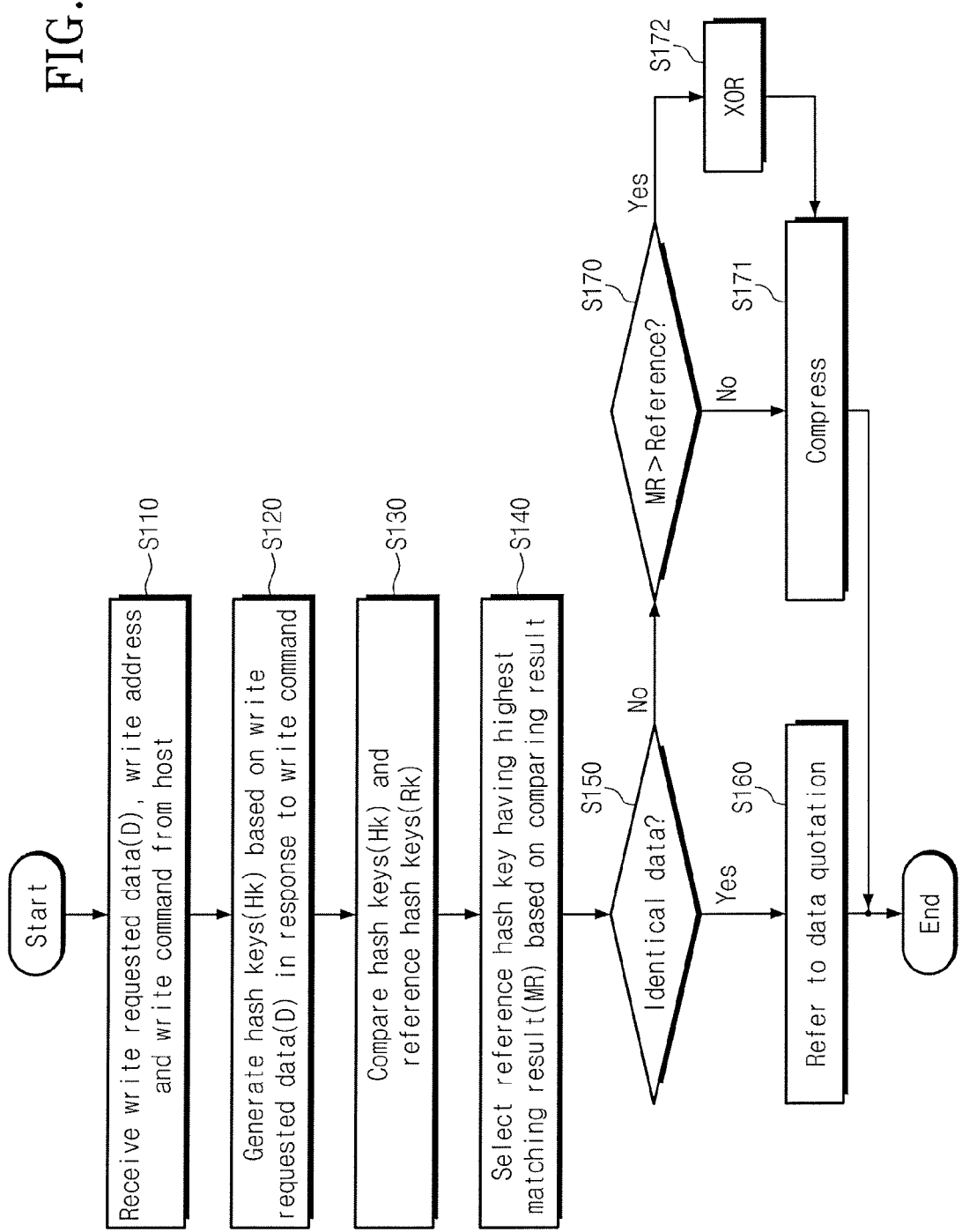
FIG. 3 is a flow chart schematically illustrating a write operation of a memory system according to an exemplary embodiment of the inventive concept.

FIG. 3 is a flow chart schematically illustrating a write operation of a memory system according to an exemplary embodiment of the inventive concept.

Referring to FIGS. 1 and 3, in step S110, a host interface 1310 receives write requested data D, a write address, and a write command from a host 1100.

In step S120, a hash key generation unit 1330 generates N hash keys based on the write requested data D, in response to the write command. In exemplary embodiments, the hash key generation unit 1330 may generate four hash keys. However, exemplary embodiments of the inventive concept are not limited thereto.

In step S130, a central processing unit 1320 compares the four hash keys Hk corresponding to the write requested data D with hash keys Rk of reference data registered at a de-duplication manage table 1341. Based on the de-duplication manage table 1341, the central processing unit 1320 determines whether the write requested data D is duplicated or similar to data stored in a nonvolatile memory device 1400.

In step S140, the central processing unit 1320 selects reference data with highest data similarity, based on a result of comparing the hash keys Hk of the write requested data D and the hash keys Rk of the reference data. For example, the central processing unit 1320 may select such reference data that the number of hash keys Rk identical to hash keys Hk of the write requested data D is greatest.

In step S150, the central processing unit 1320 determines whether the write requested data D and the selected reference data are duplicated or similar to each other, based on similarity between the write requested data D and the selected reference data.

If the hash keys Hk of the write requested data D is duplicated to the hash key Rk of the reference data, in step S160, the central processing unit 1320 does not store the write requested data D in the nonvolatile memory device 1400. That is, it is determined by the central processing unit 1320 that the write requested data D is stored in the nonvolatile memory device 1400 as reference data. Thus, an address of the write requested data D is mapped onto a physical address of reference data stored in the nonvolatile memory device 1400.

If the hash keys Hk of the write requested data D is not duplicated to the hash key Rk of the reference data, in step S170, the central processing unit 1320 determines similarity between the hash keys Hk of the write requested data D and the hash key Rk of the reference data. For example, the central processing unit 1320 determines whether similarity between the hash keys Hk of the write requested data D and the hash key Rk of the reference data is greater than a reference value.

When similarity between the hash keys Hk of the write requested data D and the hash key Rk of the reference data is not greater than the reference value, in step S171, a compression unit 1352 compresses the write requested data D under the control of the central processing unit 1320. That is, the write requested data D is compressed and then stored in a memory cell array 1410. The hash keys Hk of the write requested data D may be registered at the de-duplication manage table 1341.

When similarity between the hash keys Hk of the write requested data D and the hash key Rk of the reference data is greater than the reference value, in step S172, the central processing unit 1320 controls a delta unit 1351 to perform an XOR operation about the write requested data D and the reference data. Afterward, the method proceeds to step S171, in which a result of the XOR operation is compressed and then stored in the memory cell array 1410. Here, the size of data compressed after the XOR operation may be smaller than the size of data compressed without the XOR operation. For example, if there is performed an XOR operation about first and second data being similar to each other, identical portions of the first and second data may have the same bit values. Thus, compression efficiency of the compression unit 1352 may be improved. The compression efficiency about write requested data compressed after an XOR operation may be improved by, for example, about 20% as compared with the compression efficiency about write requested data compressed without an XOR operation.

Figure 4:
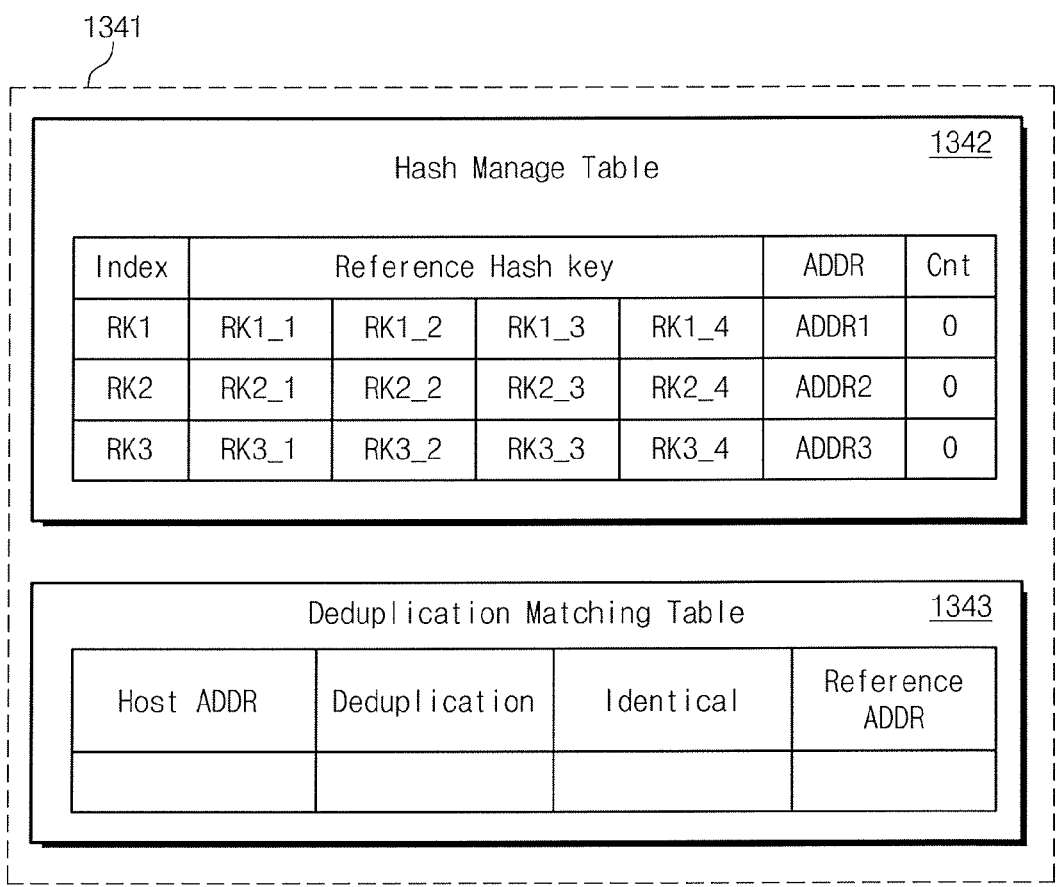
FIG. 4 is a table showing a de-duplication manage table including a hash manage table and a de-duplication matching table, according to an exemplary embodiment of the inventive concept.

FIG. 4 is a table showing a de-duplication manage table including a hash manage table and a de-duplication matching table, according to an exemplary embodiment of the inventive concept. In exemplary embodiments, a de-duplication manage table 1341 includes a hash manage table 1342, which stores hash keys of reference data stored in a nonvolatile memory device 1400. The de-duplication manage table 1341 also includes a de-duplication matching table that indicates whether write requested data is data duplicated or similar to reference data stored in the nonvolatile memory device 1400.

As illustrated in FIG. 4, the hash manage table 1342 contains an index field including reference indexes about reference data stored in the nonvolatile memory device 1400, a reference hash key field including hash keys of reference data, an address field ADD including addresses of reference data corresponding to reference indexes, and a count field Cnt including a reference frequency of reference data.

The hash manage table 1342 includes, for example, first to third reference indexes RK1 to RK3 corresponding to first to third reference data. There is exemplarily illustrated an example in which three reference data are registered at the hash manage table 1342. However, exemplar embodiments of the inventive concept are not limited thereto.

Reference hash keys corresponding to each of the first to third reference indexes RK1 to RK3 may be used to determine similarity between write requested data from a host and reference data stored in the nonvolatile memory device 1400.

For example, a reference hash key corresponding to the first reference index RK1 points out first, second, third, and fourth hash keys RK1_1, RK1_2, and RK1_4. The first reference index RK1 indicates a first address ADDR1 being an address of the nonvolatile memory device 1400 where first reference data is stored.

A reference hash key corresponding to the second reference index RK2 points out first, second, third, and fourth hash keys RK2_1, RK2_2, RK2_3, and RK2_4. The second reference index RK2 indicates a second address ADDR2 being an address of the nonvolatile memory device 1400 where second reference data is stored.

A reference hash key corresponding to the third reference index RK3 points out first, second, third, and fourth hash keys RK3_1, RK3_2, RK3_3, and RK3_4. The third reference index RK3 indicates a third address ADDR3 being an address of the nonvolatile memory device 1400 where third reference data is stored.

Also, the hash manage table 1342 stores a reference count Cnt corresponding to each reference index in response to write requested data from the host. For example, in the event that write requested data from the host refers to the first reference index RK1, the hash manage table 1342 increases a count Cnt of the first reference index RK1 by 1.

The count Cnt may be used to adjust the usage of the hash manage table 1342 when a free space of the hash manage table 1342 is below a reference value. For example, the free space of the hash manage table 1342 may be adjusted by erasing reference data with a relatively small count rather than reference data of a relatively great count.

In the event that write requested data refers to reference data, information associated therewith is registered at a de-duplication matching table 1343. The de-duplication matching table 1343 includes a host address field, a de-duplication field, an identical field, and a reference address field, which are associated with data stored in the nonvolatile memory device 1400.

FIGS. 5 to 8 are diagrams showing examples of a de-duplication matching table based on a write operation, according to an exemplary embodiment of the inventive concept.

In exemplary embodiments, a de-duplication manage table 1341 includes a de-duplication matching table 1343 indicating whether write requested data is duplicated or similar to reference data stored in a nonvolatile memory device 1400 (refer to FIG. 1).

Referring to FIGS. 5 to 8, an operation of a memory system shown in FIG. 3 will be described based on a first case in which write requested data is duplicated to reference data and a second case in which write requested data is not duplicated to the reference data.

Figure 5:
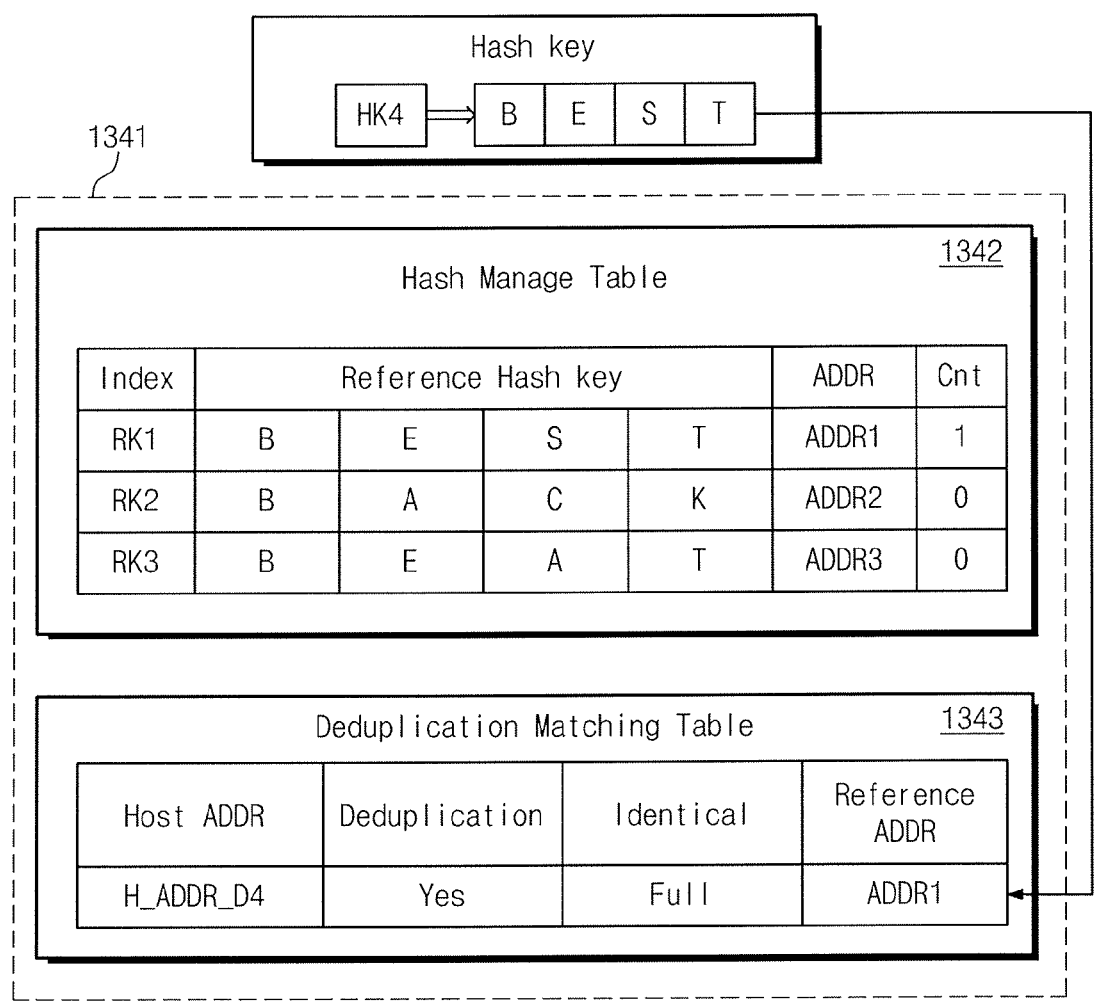
FIGS. 5 to 8 are diagrams showing examples of a de-duplication matching table based on a write operation, according to an exemplary embodiment of the inventive concept.

Referring to FIG. 5, in the first case, fourth data (e.g., write requested data) and a host address H_ADDR_D4 are provided to a storage device 1200 from a host 1100 (refer to FIG. 1). A hash key generator 1330 (refer to FIG. 1) generates a plurality of hash keys B, E, S, and T corresponding to sub-pages of the fourth data.

A central processing unit 1320 determines whether the hash keys B, E, S, and T corresponding to the fourth data are duplicated or similar to reference hash keys managed in a hash manage table 1342.

In an example shown in FIG. 5, the hash keys B, E, S, and T corresponding to the fourth data are duplicated to reference hash keys B, E, S, and T included in an entry of a first reference index RK1. Under the control of the central processing unit 1320, it is determined that the fourth data, that is, the write requested data, is duplicated to data previously stored in the nonvolatile memory device 1400.

Also, a count of the hash manage table 1342 corresponding to the first reference index RK1 is increased by 1, because the fourth data refers to the first reference data.

The central processing unit 1320 registers mapping information including the host address H_ADDR_D4 of the fourth data at the de-duplication matching table 1343.

Figure 6:
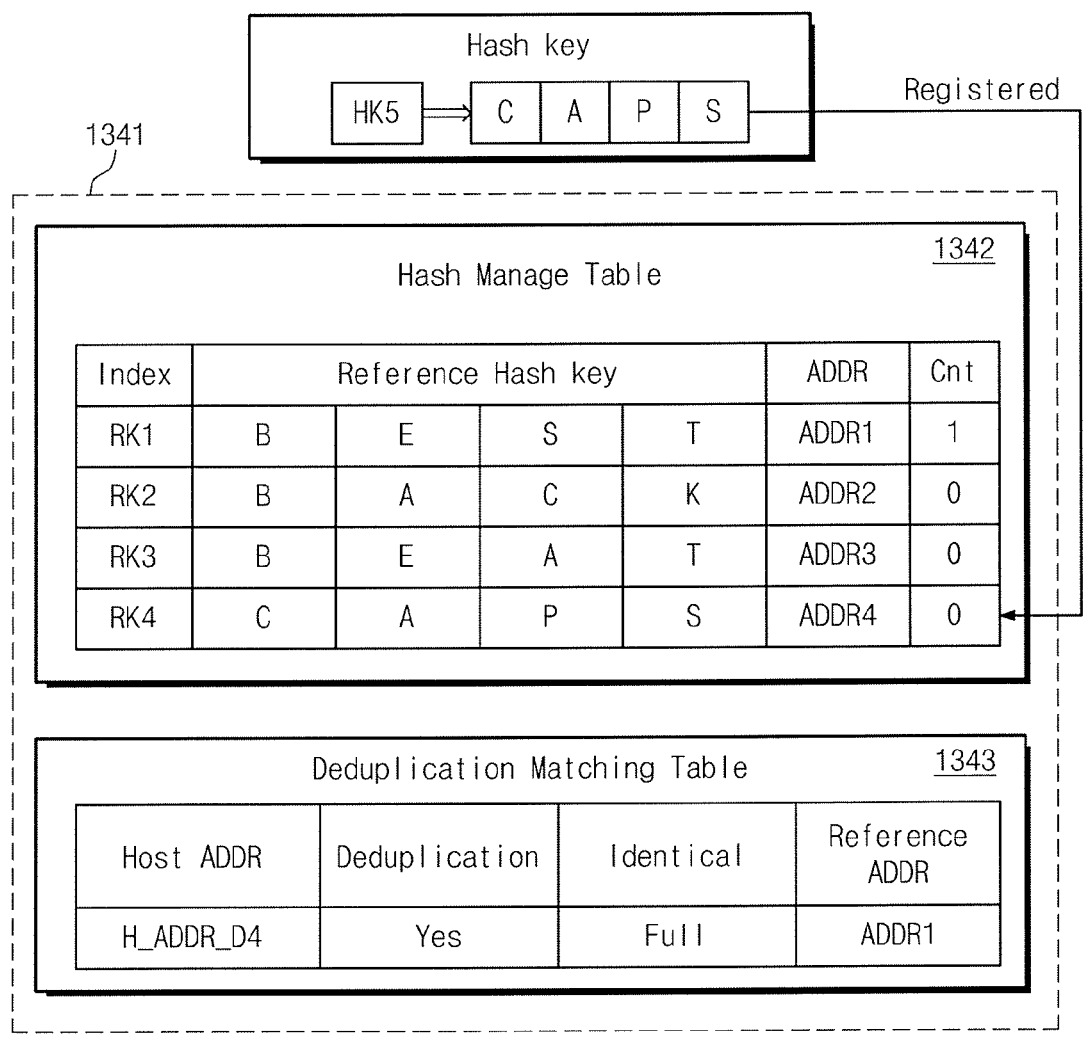

Referring to FIG. 6, in the second case, fifth data (e.g., write requested data) and a host address H_ADDR_D5 are provided to the storage device 1200 from the host 1100. The hash key generator 1330 generates a plurality of hash keys C, A, P, and S corresponding to sub-pages of the fifth data.

The central processing unit 1320 determines whether the hash keys C, A, P, and S corresponding to the fifth data are duplicated or similar to reference hash keys managed in the hash manage table 1342.

In an example shown in FIG. 6, at least one of the hash keys C, A, P, and S corresponding to the fifth data is not duplicated to reference hash keys included in an entry of a fourth reference index RK4. Under the control of the central processing unit 1320, it is determined that similarity between the hash keys of the fifth data and reference hash keys included in the hash manage table 1342 is lower than a reference value. For example, the reference value is set to such a condition that at least three or more of four hash keys are hit. However, exemplary embodiments of the inventive concept are not limited thereto.

The fifth data, that is, the write requested data, is compressed and then stored in a free space of the nonvolatile memory device 1400, and hash keys C, A, P, S of the first data are registered at the hash manage table 1342 as new reference data RK4.

Figure 7:
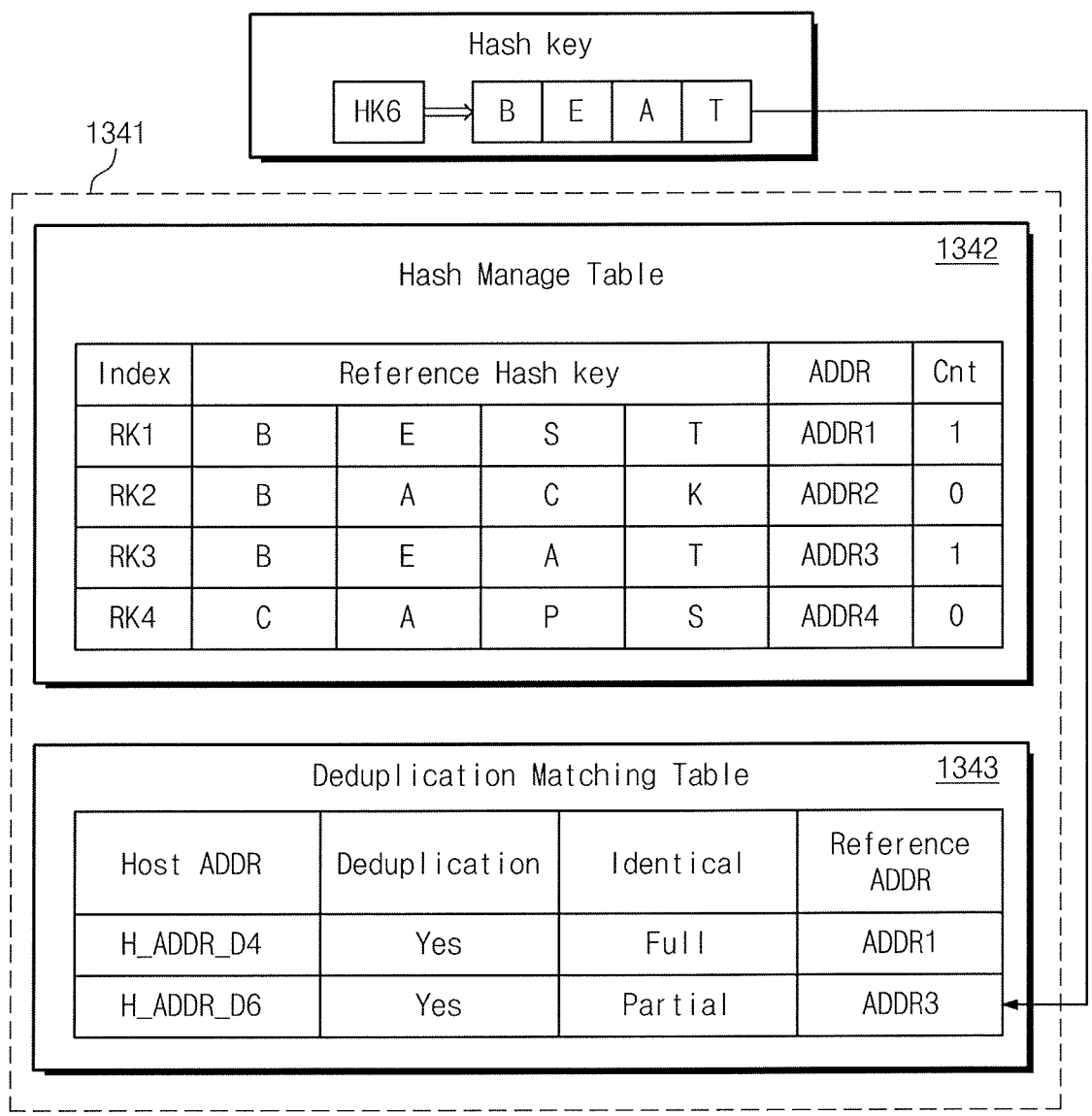

Referring to FIG. 7, in the second case, sixth data (e.g., write requested data) and a host address H_ADDR_D6 are provided to the storage device 1200 from the host 1100. The hash key generator 1330 generates a plurality of hash keys B, E, A, and T corresponding to sub-pages of the sixth data.

The central processing unit 1320 determines whether the hash keys B, E, A, and T corresponding to the sixth data are duplicated or similar to reference hash keys managed in the hash manage table 1342.

The central processing unit 1320 determines whether similarity between the hash keys B, E, A, and T corresponding to the fifth data and reference hash keys managed in the hash manage table 1342 is above a reference value. In an example shown in FIG. 7, similarity between the hash keys B, E, A, and T corresponding to the fifth data and reference hash keys B, E, A, and T included in an entry of a third reference index RK3 may be above the reference value.

Thus, the central processing unit 1320 performs an XOR operation on the sixth data and third reference data, stored in the nonvolatile memory device 1400, corresponding to the third reference index RK3, and compresses a result of the XOR operation. The central processing unit 1320 stores the compressed data in an empty block of the nonvolatile memory device 1400. At this time, as the sixth data refers to the third reference index RK3, a count of the hash manage table 1342 corresponding to the third reference index RK3 is increased by 1.

The central processing unit 1320 registers mapping information including the host address H_ADDR_D6 of the sixth data at the de-duplication matching table 1343.

Figure 8:
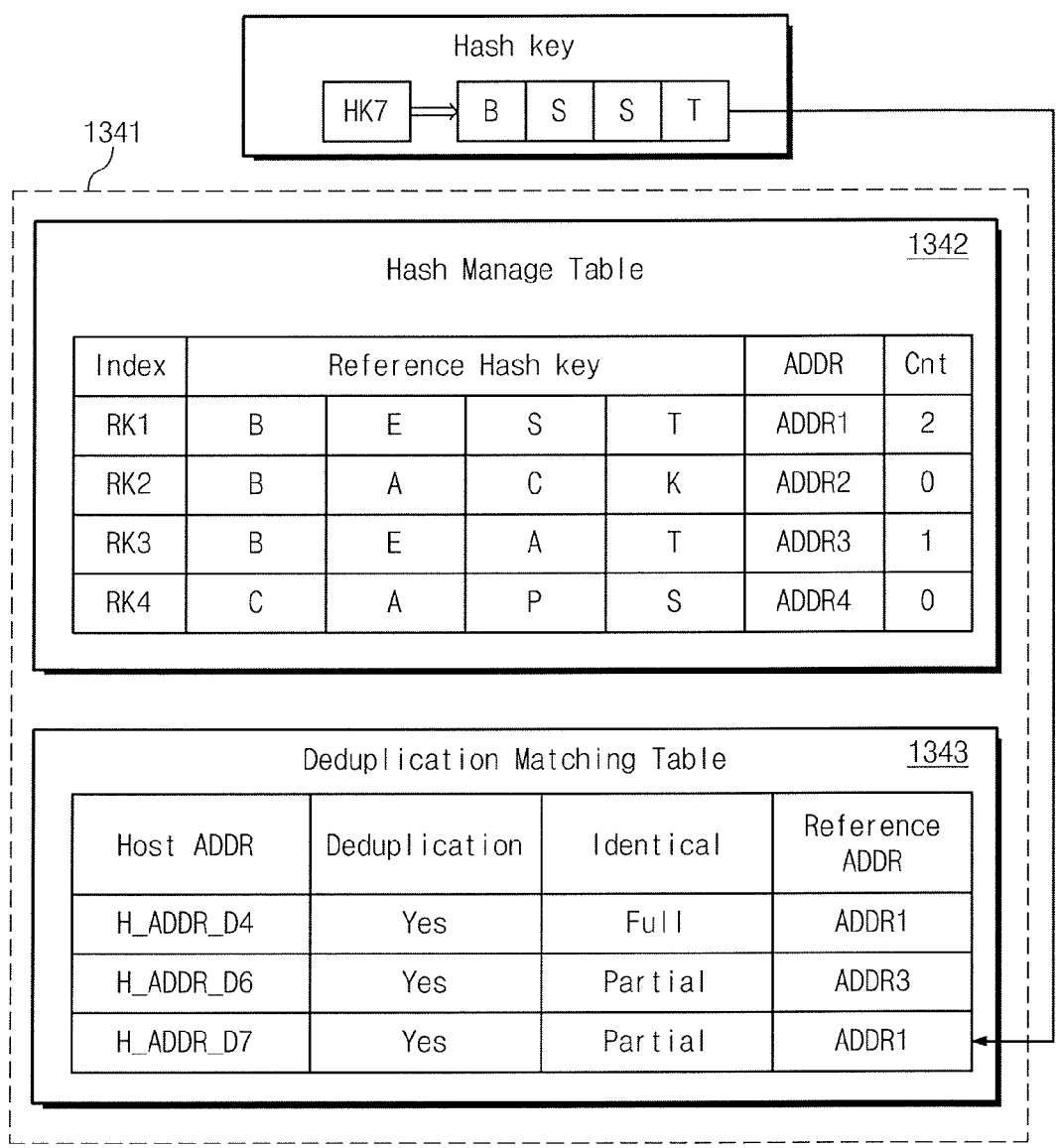

Referring to FIG. 8, in the second case, seventh data (e.g., write requested data) and a host address H_ADDR_D7 are provided to the storage device 1200 from the host 1100. The hash key generator 1330 generates a plurality of hash keys B, S, S, and T corresponding to sub-pages of the seventh data.

The central processing unit 1320 determines whether the hash keys B, S, S, and T corresponding to the seventh data are duplicated or similar to reference hash keys managed in a hash manage table 1342.

The central processing unit 1320 determines whether similarity between the hash keys B, S, S, and T corresponding to the seventh data and reference hash keys managed in the hash manage table 1342 is above the reference value. In an example shown in FIG. 8, similarity between the hash keys B, S, S, and T corresponding to the fifth data and reference hash keys B, E, S, and T included in an entry of the first reference index RK1 may be above the reference value.

Thus, the central processing unit 1320 performs an XOR operation on the seventh data and the first reference data, stored in the nonvolatile memory device 1400, corresponding to the first reference index RK1, and compresses a result of the XOR operation. The central processing unit 1320 stores the compressed data in an empty block of the nonvolatile memory device 1400. At this time, as the seventh data refers to the first reference index RK1, a count of the hash manage table 1342 corresponding to the first reference index RK1 is increased by 1.

The central processing unit 1320 registers mapping information including the host address H_ADDR_D7 of the seventh data at the de-duplication matching table 1343.

Figure 9:
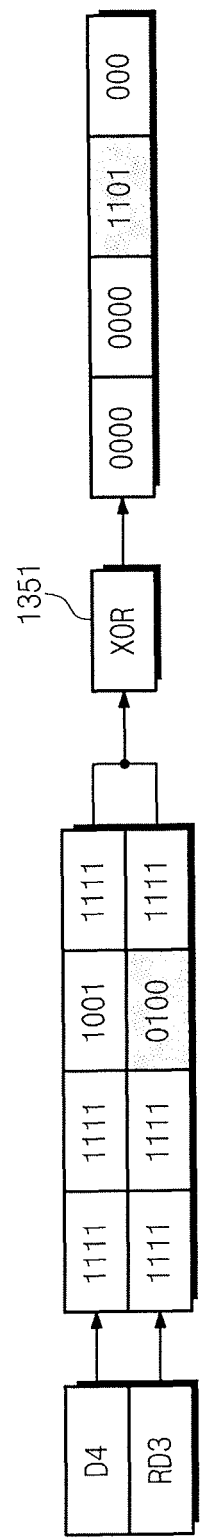
FIG. 9 is a diagram for describing an operation of a delta unit shown in FIG. 1 according to an exemplary embodiment of the inventive concept.

FIG. 9 is a diagram for describing an operation of a delta unit shown in FIG. 1.

Referring to FIG. 9, when similarity between hash keys of write requested data D4 and reference hash keys included in a hash manage table 1342 is above a reference value, a delta unit 1351 performs an XOR operation on the write requested data D4 and reference data RD3. For example, the delta unit 1351 performs the XOR operation on both data when similarity between hash keys of the fourth data D4 and reference hash keys corresponding to a third reference index RK3 is above the reference value.

As illustrated in FIG. 9, as a result of an XOR operation performed on two data D4 and RD3, an output value about similar portions is "0". In contrast, an output value about portions being not similar may be either "1" or "0". For example, an output value about portions being not similar may be defined by start and end values of "1".

Thus, as compared with such a case in which the whole write requested data is compressed, a compression unit 1352 performs compression based on data portions being not similar.

Figure 10:
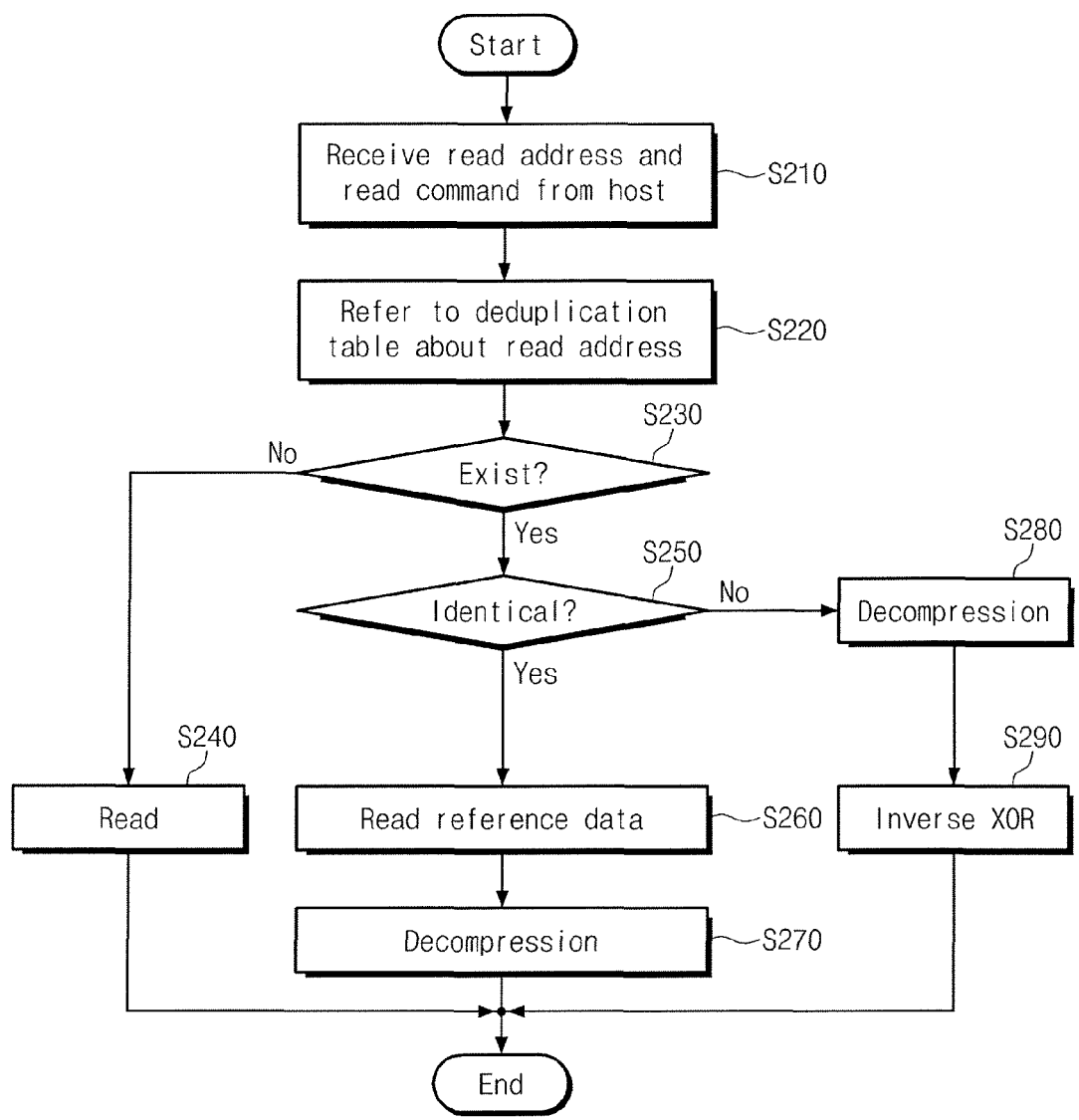
FIG. 10 is a flow chart schematically illustrating a read operation of a memory system according to an exemplary embodiment of the inventive concept.

FIG. 10 is a flow chart schematically illustrating a read operation of a memory system according to an exemplary embodiment of the inventive concept.

Referring to FIGS. 1 and 10, in step S210, a storage device 1200 receives a read address and a read command from a host 1100.

In step S220, a central processing unit 1320 refers to a de-duplication manage table 1341 to determine whether the read address exists.

In step S230, the central processing unit 1320 determines whether a host address of read requested data exists in the de-duplication manage table 1341.

As a consequence of determining that the host address of the read requested data does not exist in the de-duplication manage table 1341, in step S240, data is read out from a storage region of a nonvolatile memory device 1400 corresponding to the read address. The central processing unit 1320 de-compresses the read data to output the de-compressed data to the host 1100.

As a consequence of determining that the host address of the read requested data exists in the de-duplication manage table 1341, in step S250, the central processing unit 1320 determines whether the read requested data is identical to reference data.

If the read requested data is identical to the reference data, in step S260, the central processing unit 1320 checks an address of reference data corresponding to the read requested data stored in a de-duplication matching table 1343 (refer to FIG. 5). Data is read from a storage region of the nonvolatile memory device 1400 corresponding to an address of the reference data.

In step S270, the central processing unit 1320 de-compresses the read data and outputs the de-compressed data to the host 1100.

When the read requested data is not identical to the reference data, in step S280, the compression unit 1352 de-compresses read requested data as a result of an XOR operation performed on write requested data and reference data, under the control of the central processing unit 1320.

In step S290, a delta unit 1351 performs an inverse XOR operation on the de-compressed data under the control of the central processing unit 1320. The central processing unit 1320 reads inversely XORed data, that is, read requested data and reference data, to provide the read requested data to the host 1100.

Figures 11, 12:
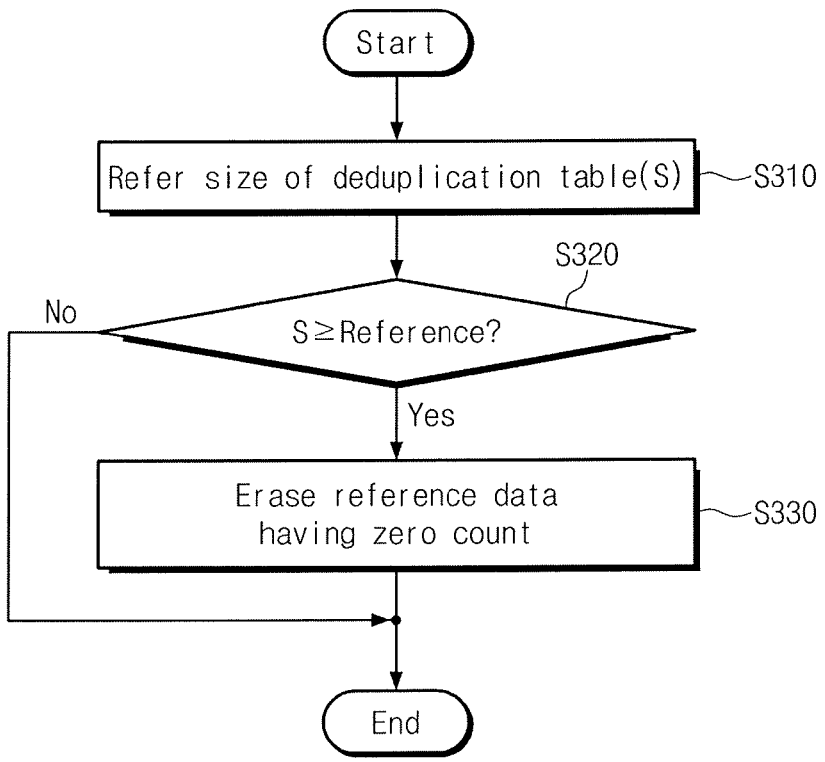
FIG. 11 is a diagram schematically illustrating a de-duplication manage table based on a read operation according to an exemplary embodiment of the inventive concept.
FIGS. 12 to 14 are flow charts schematically illustrating an erase operation of reducing the size of a de-duplication manage table according to an exemplary embodiment of the inventive concept.

FIG. 11 is a diagram schematically illustrating a de-duplication manage table based on a read operation according to an exemplary embodiment of the inventive concept.

Referring to FIGS. 1 and 11, it is assumed that a read request about fourth and sixth data is issued from a host 1100.

First, a central processing unit 1320 determines whether an address of read requested data (hereinafter referred to as "fourth data") exists in a de-duplication matching table 1343. If an address of the fourth data exists in the de-duplication matching table 1343, a central processing unit 1320 determines whether the fourth data is identical to reference data.

As a consequence of determining that the fourth data is identical to the reference data, the central processing unit 1320 reads reference data referring to a first address, and the read reference data is de-compressed through a compression unit 1352. The de-compressed data is provided to the host 1100.

As another example, the central processing unit 1320 determines whether an address of read requested data (hereinafter referred to as "sixth data") exists in the de-duplication matching table 1343. If an address of the sixth data exists in the de-duplication matching table 1343, the central processing unit 1320 determines whether the sixth data is identical to reference data.

The sixth data may not be identical to reference data having a third address ADDR3, or similarity between the sixth data and the reference data may be above a reference value. Thus, the central processing unit 1320 reads the sixth data corresponding to a sixth read address and reference data corresponding to a third address, and the read data is de-decompressed. The central processing unit 1320 performs an inverse XOR operation on the de-compressed reference data and sixth data and provides the inversely XORed data to the host 1100.

Figure 13:
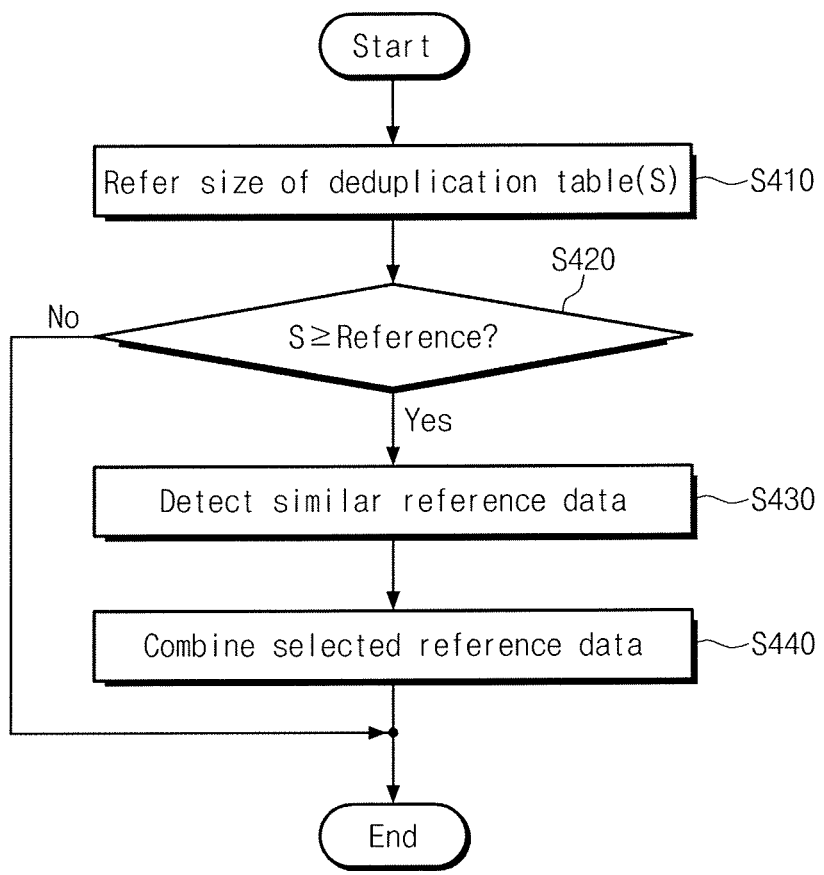
Figure 14:
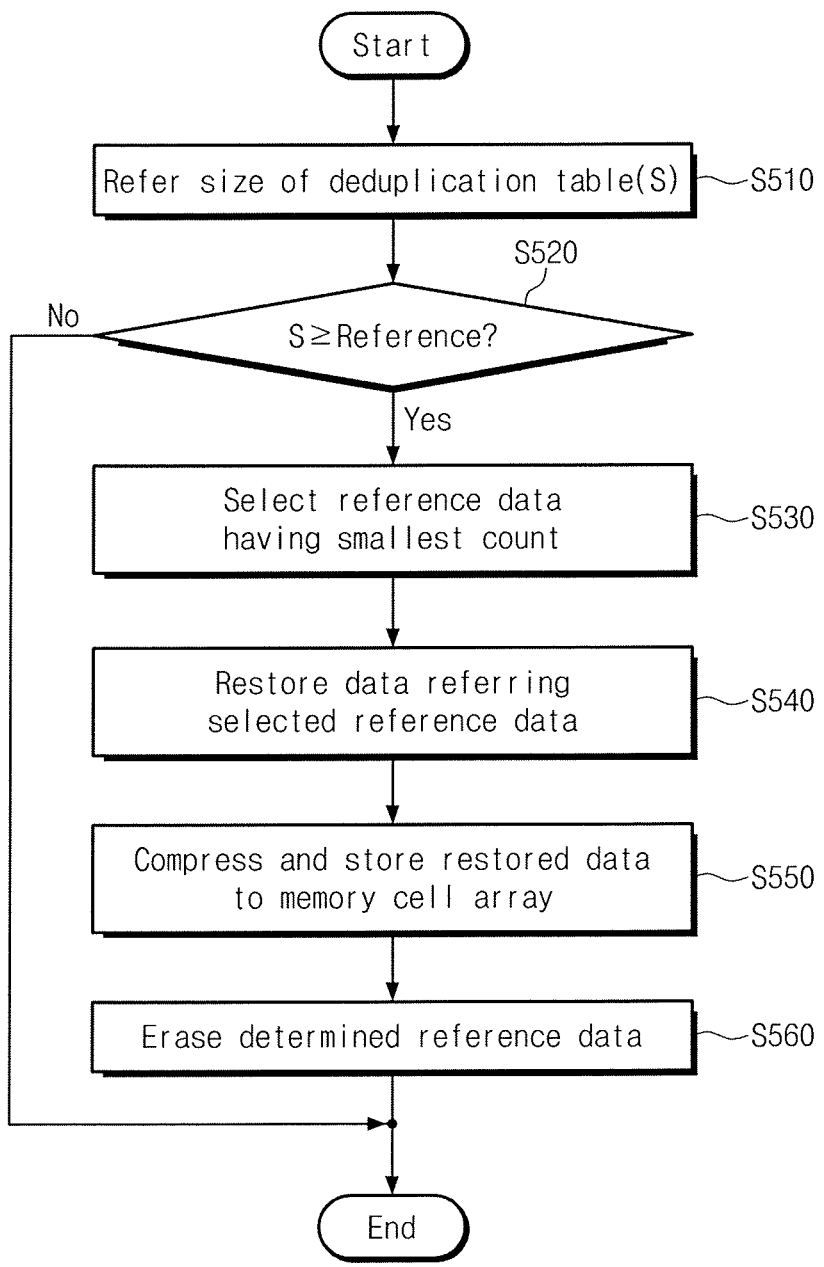

FIGS. 12 to 14 are flow charts schematically illustrating an erase operation of reducing the size of a de-duplication manage table according to an exemplary embodiment of the inventive concept.

If a de-duplication manage table 1341 manages identification information about all data stored in a nonvolatile memory device, that is, reference data, the size of the de-duplication manage table 1341 becomes larger. A storage device according to an exemplary embodiment of the inventive concept is configured such that the size of the de-duplication manage table 1341 is retained constantly.

Referring to FIGS. 1 and 12, in a first case, a central processing unit 1320 erases reference data that has the least reference frequency, that is, the least count.

In step S310, the central processing unit 1320 refers to the size S of a de-duplication manage table 1341.

In step S320, the central processing unit 1320 determines whether the size S of the de-duplication manage table 1341 reaches a reference size.

If the size S of the de-duplication manage table 1341 reaches the reference size, in step S330, the central processing unit 1320 erases information associated with reference data, having a count Cnt of "0", from among reference data included in a hash manage table 1342 (refer to FIG. 5). For example, the central processing unit 1320 may erase information associated with reference data that is first received.

In contrast, if the size S of the de-duplication manage table 1341 does not exceed the reference size, the method is ended without an erase operation.

Referring to FIG. 13, in a second case, the central processing unit 1320 reduces the number of reference data by combing a plurality of reference data.

In step S410, the central processing unit 1320 refers to the size S of the de-duplication manage table 1341.

In step S420, the central processing unit 1320 determines whether the size S of the de-duplication manage table 1341 reaches a reference size.

If the size S of the de-duplication manage table 1341 reaches the reference size, in step S430, the central processing unit 1320 detects first and second reference data having similar data information by comparing information associated with reference data.

In step S440, the central processing unit 1320 controls such that the second reference data with a small count refers to the first reference data with a great count. Afterwards, information associated with the second reference data is excluded from the de-duplication manage table 1341. Likewise, if a memory size of the de-duplication manages table 1341 reaches a reference size, the method is ended without erasing.

Referring to FIG. 14, in a third case, the central processing unit 1320 erases information associated with reference data having the least count from among reference data managed using the hash manage table 1342.

In step S510, the central processing unit 1320 refers to the size S of the de-duplication manage table 1341.

In step S520, the central processing unit 1320 determines whether the size S of the de-duplication manage table 1341 reaches a reference size.

If the size S of the de-duplication manage table 1341 reaches the reference size, in step S530, the central processing unit 1320 selects reference data having the least count from among the reference data managed using the hash manage table 1342.

In step S540, the central processing unit 1320 restores data referring to the selected reference data through an inverse XOR operation.

In step S550, the central processing unit 1320 compresses and stores the restored data.

In step S560, the central processing unit 1320 erases information associated with reference data having the least count.

With the above-described operations, the central processing unit 1320 erases information associated with reference data stored in the de-duplication manage table 1341.

Figure 15:
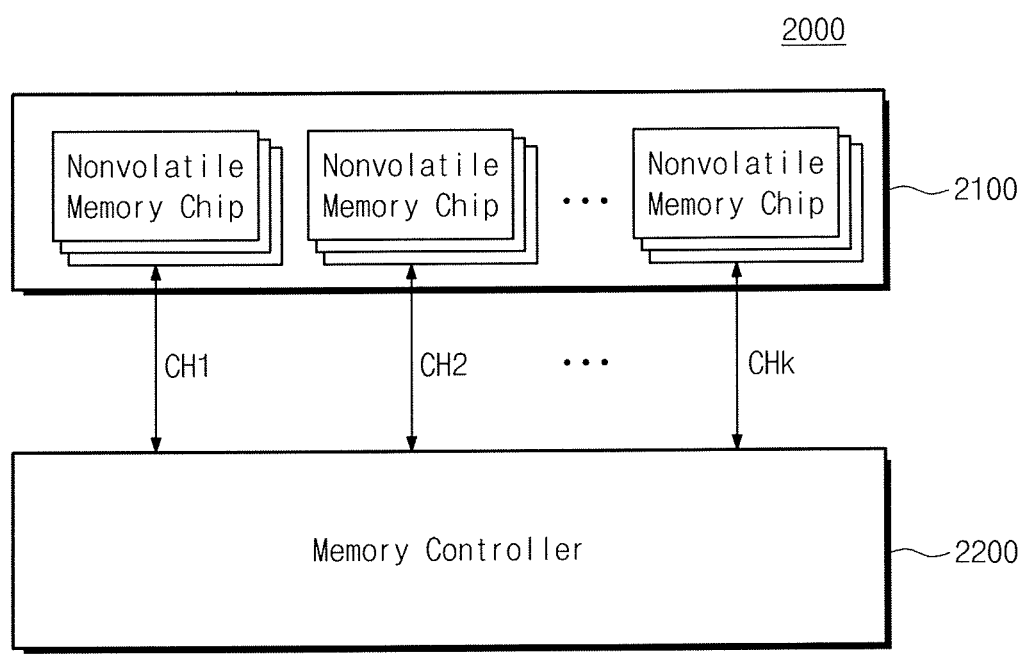
FIG. 15 is a block diagram schematically illustrating an application of a memory system shown in FIG. 1 according to an exemplary embodiment of the inventive concept.

FIG. 15 is a block diagram schematically illustrating an application of a memory system shown in FIG. 1. Referring to FIG. 15, a memory system 2000 includes a nonvolatile memory 2100 and a memory controller 2200. The nonvolatile memory 2100 contains a plurality of nonvolatile memory chips. The nonvolatile memory chips are divided into a plurality of groups. Nonvolatile memory chips in each group communicate with the memory controller 2200 through a common channel. For example, there is illustrated an example in which a plurality of nonvolatile memory chips communicate with the memory controller 2200 through a plurality of channels CH1 to CHk.

In FIG. 15, a plurality of nonvolatile memory chips are connected to a channel. However, exemplary embodiments of the inventive concept are not limited thereto. For example, the memory system 2000 may be changed such that a nonvolatile memory chip is connected to a channel.

As described with reference to FIGS. 1 to 14, the memory controller 2200 may manage a storage space of a nonvolatile memory device through de-duplication about write requested data from a host.

Figure 16:
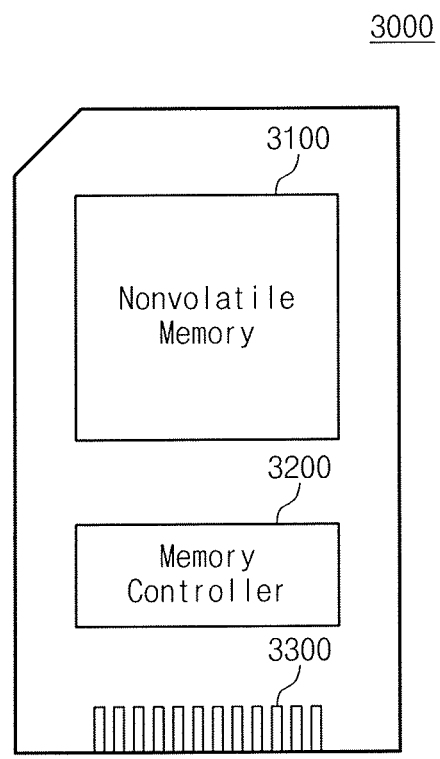
FIG. 16 is a block diagram illustrating a memory card according to an exemplary embodiment of the inventive concept.

FIG. 16 is a block diagram illustrating a memory card 3000 according to an exemplary embodiment of the inventive concept. Referring to FIG. 16, a memory card 3000 includes a nonvolatile memory 3100, a memory controller 3200, and a connector 3300.

The nonvolatile memory 3100 or the memory controller 3200 performs a reset operation according to exemplary embodiments of the inventive concept. The connector 3300 provides an electrical connection between the memory card 3000 and an external device (e.g., a host).

The memory card 3000 may be, for example, a PC (PCMCIA) card, a CF card, an SM (or SMC) card, a memory stick, a multimedia card (MMC, RS-MMC, MMC-micro), a security card (SD, miniSD, microSD, SDHC), a universal flash storage (UFS) device, etc.

Figure 17:
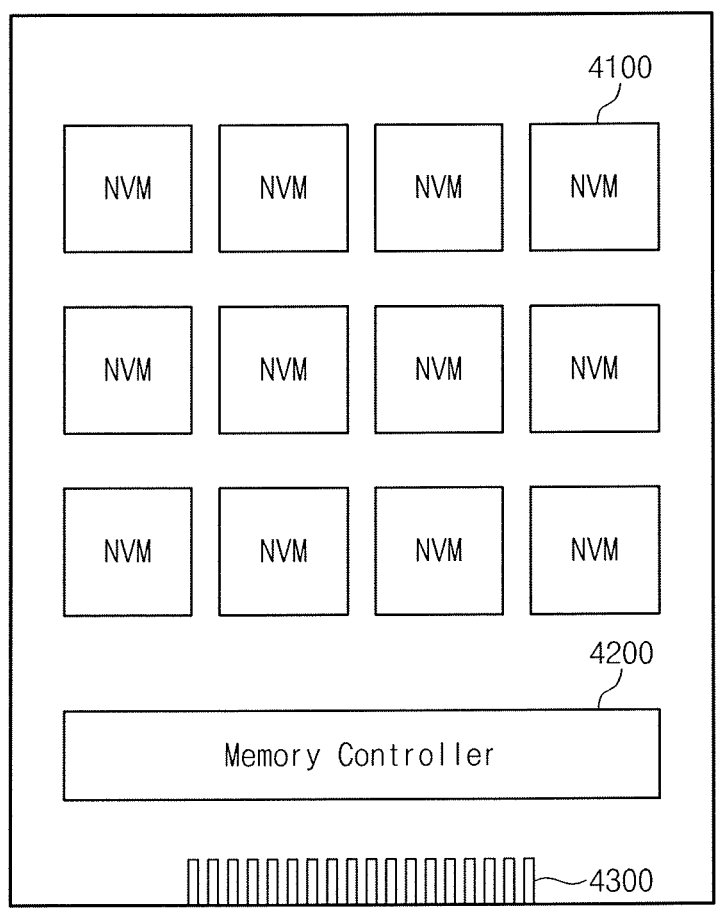
FIG. 17 is a block diagram schematically illustrating a solid state drive according to an exemplary embodiment of the inventive concept.

FIG. 17 is a block diagram schematically illustrating a solid state drive according to an exemplary embodiment of the inventive concept. Referring to FIG. 17, a solid state drive 4000 includes a plurality of nonvolatile memories 4100, a memory controller 4200, and a connector 4300.

Each nonvolatile memory 4100 or the memory controller 4200 performs a reset operation according to exemplary embodiments of the inventive concept. The connector 4300 provides an electrical connection between the solid state drive 4000 and an external device (e.g., a host).

Figure 18:
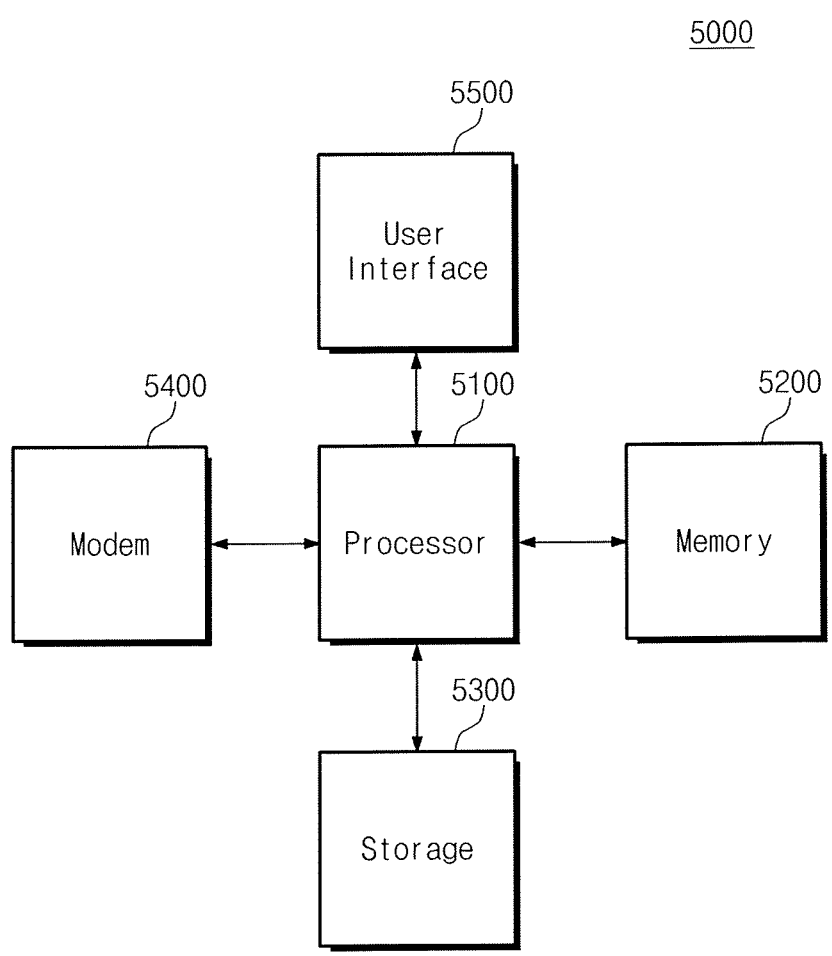
FIG. 18 is a block diagram schematically illustrating a computing device according to an exemplary embodiment of the inventive concept.

FIG. 18 is a block diagram schematically illustrating a computing device 5000 according to an exemplary embodiment of the inventive concept. Referring to FIG. 18, a computing device 5000 includes a processor 5100, a memory 5200, storage 5300, a modem 5400, and a user interface 5500.

The processor 5100 controls the overall operation of the computing device 5000 and may perform a logical operation. The processor 5100 may be formed of, for example, a system-on-chip (SoC).

The memory 5200 communicates with the processor 5100. The memory 5200 may be, for example, a working memory (or a main memory) of the processor 5100 or the computing device 5000. The memory 5200 may include, for example, a volatile memory such as a static RAM, a dynamic RAM, a synchronous DRAM, etc., or a nonvolatile memory such as a flash memory, a phase-change RAM (PRAM), a magnetic RAM (MRAM), a resistive RAM (RRAM), a ferroelectric RAM (FRAM), etc.

The modem 5400 may communicate with an external device under the control of the processor 5100. For example, the modem 5400 may communicate with the external device in a wired or wireless manner. The modem 5400 may communicate based on at least one of a variety of wireless communications manners such as, for example, LTE (Long Term Evolution), WiMax, GSM (Global System for Mobile communication), CDMA (Code Division Multiple Access), Bluetooth, NFC (Near Field Communication), WiFi, RFID (Radio Frequency Identification, etc., or at least one of a variety of wired communications manners such as, for example, USB (Universal Serial Bus), SATA (Serial AT Attachment), SCSI (Small Computer Small Interface), Firewire, PCI (Peripheral Component Interconnection), etc.

The user interface 5500 may communicate with a user under the control of the processor 5100. For example, the user interface 5500 may include user input interfaces such as a keyboard, a keypad, a button, a touch panel, a touch screen, a touch pad, a touch ball, a camera, a microphone, a gyroscope sensor, a vibration sensor, etc. The user interface 5500 may further include user output interfaces such as, for example, an LCD, an OLED (Organic Light Emitting Diode) display device, an AMOLED (Active Matrix OLED) display device, an LED, a speaker, a motor, etc.

While the inventive concept has been described with reference to exemplary embodiments thereof, it will be apparent to those skilled in the art that various changes and modifications may be made without departing from the spirit and scope of the present inventive concept. Therefore, it should be understood that the above embodiments are not limiting, but illustrative.

What is claimed is:

1. A storage device, comprising:
   a nonvolatile memory device configured to store a plurality of reference data;
   a memory configured to store a hash manage table used to manage a plurality of reference hash keys of each of the plurality of reference data;
   a hash key generator configured to generate a plurality of hash keys based on write requested data; and
   a memory controller configured to compare the plurality of hash keys and reference hash keys of each reference data,
   wherein the memory controller selects one of the plurality of reference data according to a similarity between the plurality of hash keys and the plurality of reference hash keys of each reference data,
   wherein the memory controller performs an XOR operation on the write requested data and the selected reference data, and compresses and stores the XORed data in the nonvolatile memory device, when the similarity between the plurality of hash keys and the plurality of reference hash keys of the selected reference data is above a reference value,
   wherein the memory controller compresses and stores the write requested data in the nonvolatile memory device when the similarity between the plurality of hash keys and the plurality of reference hash keys of the selected reference data is not above the reference value.

2. The storage device of claim 1, wherein the memory controller divides the write requested data into a plurality of sub-pages, and wherein the hash key generator generates the plurality of hash keys corresponding to the plurality of sub-pages.

3. The storage device of claim 1, wherein the memory further stores a de-duplication matching table, and wherein when the similarity between the plurality of hash keys of the write requested data and the plurality of reference hash keys of the selected reference data is above the reference value, reference information of the write requested data is registered at the de-duplication matching table.

4. The storage device of claim 1, wherein when the plurality of reference hash keys are duplicated to a plurality of hash keys of the selected reference data, the memory controller is configured to map an address of the write requested data onto an address of the nonvolatile memory device where the selected reference data is stored.

5. The storage device of claim 1, wherein when the similarity between the plurality of hash keys of the write requested data and the plurality of reference hash keys of the selected reference data does not exceed the reference value, the plurality of hash keys are registered at the hash manage table.

6. The storage device of claim 1, wherein when an empty size of the hash manage table reaches a reference size, the memory controller erases a plurality of reference hash keys associated with reference data not referring to a plurality of hash key information of the write requested data from among a plurality of reference hash keys of each reference data included in the hash manage table.

7. The storage device of claim 1, wherein when an empty size of the hash manage table reaches a reference size, the memory controller combines at least two of a plurality of reference data included in the hash manage table.

8. The storage device of claim 7, wherein the at least two reference data is combined through an XOR operation.

9. The storage device of claim 1, wherein when an empty size of the hash manage table reaches a reference size, the memory controller and a reference frequency between a plurality of hash keys of the selected reference data and the plurality of hash keys of the write requested data is minimal, and the memory controller performs an inverse XOR operation on the selected reference data and reference data referring to the selected reference data.

10. The storage device of claim 9, wherein a plurality of hash keys of the selected reference data are excluded from the hash manage table, and the inversely XORed data is stored in the nonvolatile memory device through compression.

11. The storage device of claim 1, wherein the de-duplication manage table is stored in a DRAM or an SRAM.

12. An operating method of a storage device, comprising:
    generating a plurality of hash keys about write requested data;
    comparing the plurality of hash keys thus generated with a plurality of reference hash keys of each of a plurality of reference data managed using a hash manage table;
    performing an XOR operation on the write requested data and one of the plurality of reference data, and compressing and storing the XORed data in the storage device, upon determining that a similarity between the plurality of hash keys of the write requested data and a plurality of reference hash keys of the one of the plurality of reference data is above a reference value; and
    compressing and storing the write requested data in the storage device upon determining that the similarity between the plurality of hash keys of the write requested data and the plurality of reference hash keys of the one of the plurality of reference data is not above the reference value.

13. The operating method of claim 12, wherein when an empty size of the hash manage table reaches a reference size, at least two of a plurality of reference data managed using the hash manage table are combined.

14. An operating method of a storage device, comprising:
    generating a plurality of hash keys about write requested data;
    comparing the plurality of hash keys thus generated with a plurality of reference hash keys of each of a plurality of reference data;
    selecting one of the plurality of reference data according to a similarity between the plurality of hash keys and the plurality of reference hash keys;
    performing an XOR operation on the write requested data and the selected reference data, and compressing and storing the XORed data in a memory, the memory storing the plurality of reference data, upon determining that a similarity between the plurality of hash keys and the plurality of reference hash keys of the selected reference data is above a reference value;
    compressing and storing the write requested data in the memory upon determining that the similarity between the plurality of hash keys and the plurality of reference hash keys of the selected reference data is not above the reference value; and
    erasing at least one of the plurality of reference data when an empty size of the memory reaches a reference size.

15. The operating method of claim 14, wherein the memory stores a count of each of the plurality of reference data,
    wherein the count of each of the plurality of reference data increases according to a number of references of each of the plurality of the reference data.

16. The operating method of claim 15, wherein when the empty size of the memory reaches the reference size, a reference data having a lowest count among the plurality of reference data is erased based on counts of the plurality of reference data stored in the memory.

17. The operating method of claim 15, wherein erasing the plurality of reference data comprises:
    detecting a first reference data having a plurality of first hash keys and a second reference data having a plurality of second hash keys similar to the plurality of first hash keys among the plurality of reference data;
    controlling the second reference data to refer the first reference data; and
    erasing the second reference data,
    wherein the first reference data referred by the second reference data is maintained in the memory.

18. The operating method of claim 17, wherein a second count of the second reference data is lower than a first count of the first reference data.

* * * * *